GARAGE STRUCTURES AND SIMILAR STORAGE DEVICES

Filed Aug. 29, 1952 5 Sheets-Sheet 1

INVENTOR.
HANS INGOLD
BY Leon M. Strauss,
AGT.

GARAGE STRUCTURES AND SIMILAR STORAGE DEVICES

Filed Aug. 29, 1952 5 Sheets-Sheet 2

INVENTOR.
HANS INGOLD
BY
Leon M. Strauss
AGT.

INVENTOR.
HANS INGOLD
BY Henry M. Strauss
AGT.

INVENTOR.
HANS INGOLD
BY Geo. M. Strauss
AGT.

Sept. 11, 1956 H. INGOLD 2,762,515

GARAGE STRUCTURES AND SIMILAR STORAGE DEVICES

Filed Aug. 29, 1952 5 Sheets-Sheet 5

INVENTOR.
HANS INGOLD
BY Leon M. Strauss
AGT.

2,762,515

GARAGE STRUCTURES AND SIMILAR STORAGE DEVICES

Hans Ingold, Lucerne, Switzerland

Application August 29, 1952, Serial No. 307,037

Claims priority, application Switzerland December 21, 1951

4 Claims. (Cl. 214—16.1)

The present invention relates in particular, but not exclusively to garage structures for automotive vehicles and the like.

It is one of the objects of the present invention to provide means facilitating automotive vehicles to be easily stored on and readily discharged from a given garage and like area without regard to the location of storage or discharge of the vehicle.

It is another object of the present invention to provide means affording a minimum of space for storing automotive vehicles, which may be loaded or discharged at will and substantially with a minimum of loss of time.

It is a further object of the present invention to provide means offering the possibility of displacing predetermined vehicles within a given storage area to thereby provide access to a predetermined vehicle to be loaded on or discharged from a selected location of the aforesaid area.

Still another object of the present invention is to provide means ensuring speedy and uniform operation, reduction of inertia of the moving parts, simplicity and economy of construction and great adaptability of the vehicle garage system to different fields of use, such as warehouses etc.

Yet a further object of the present invention is to provide means contributing to a strong, durable and efficient, compact and conveniently operable garage or storage system which may be readily installed and necessitates only a minimum of manipulations through an electric selective system to bring about access to any location of a given area for loading or discharging a vehicle.

It is still a further object of the invention to provide means involving only relatively simple elements, such as platforms, to be coupled with an electrically operated conveyor or transportation system so as to obtain a displacement of a respective platform or platforms and to thereby provide a passageway to a predetermined or selected platform from which a vehicle is to be discharged or onto which a vehicle is to be loaded.

With the foregoing objects outlined and with other objects in view which will appear as the description proceeds, the invention consists in the novel features hereinafter described in detail, illustrated in the accompanying drawings and more particularly pointed out in the appended claims.

Figure 9:
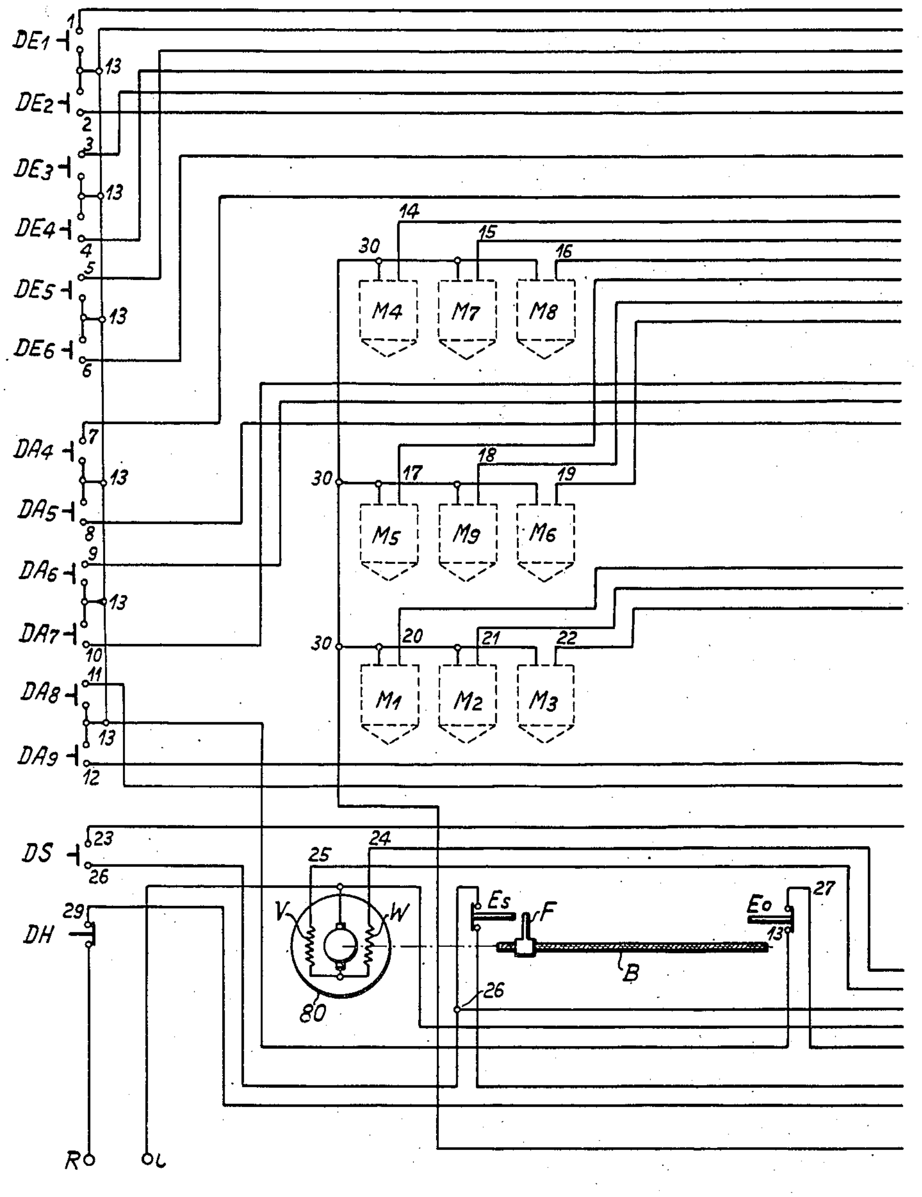
Figure 9A:
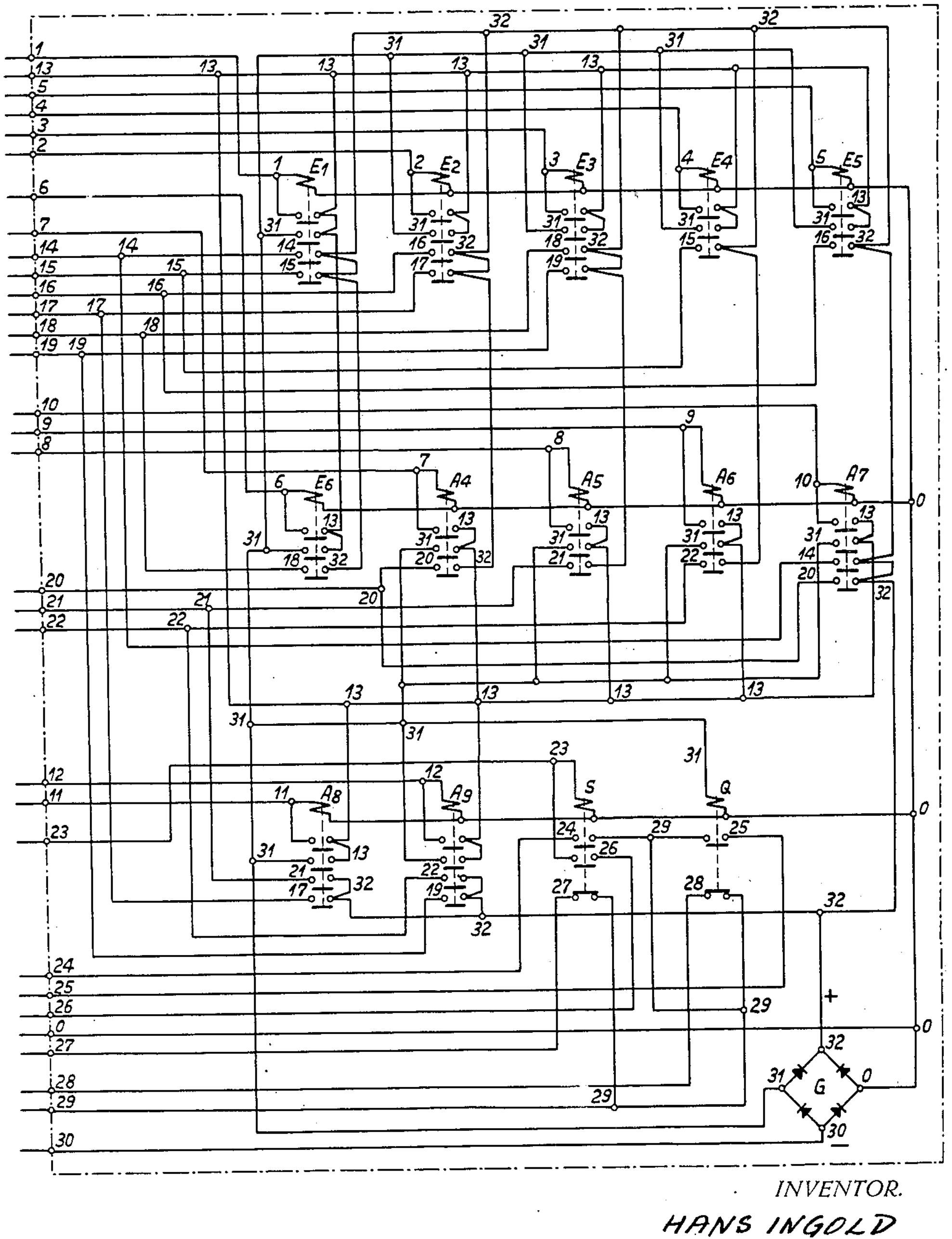

Figs. 9 and 9*a* show the switching arrangement and diagram for the electric control device employed in the garage system made in accordance with the invention.

Figure 1:
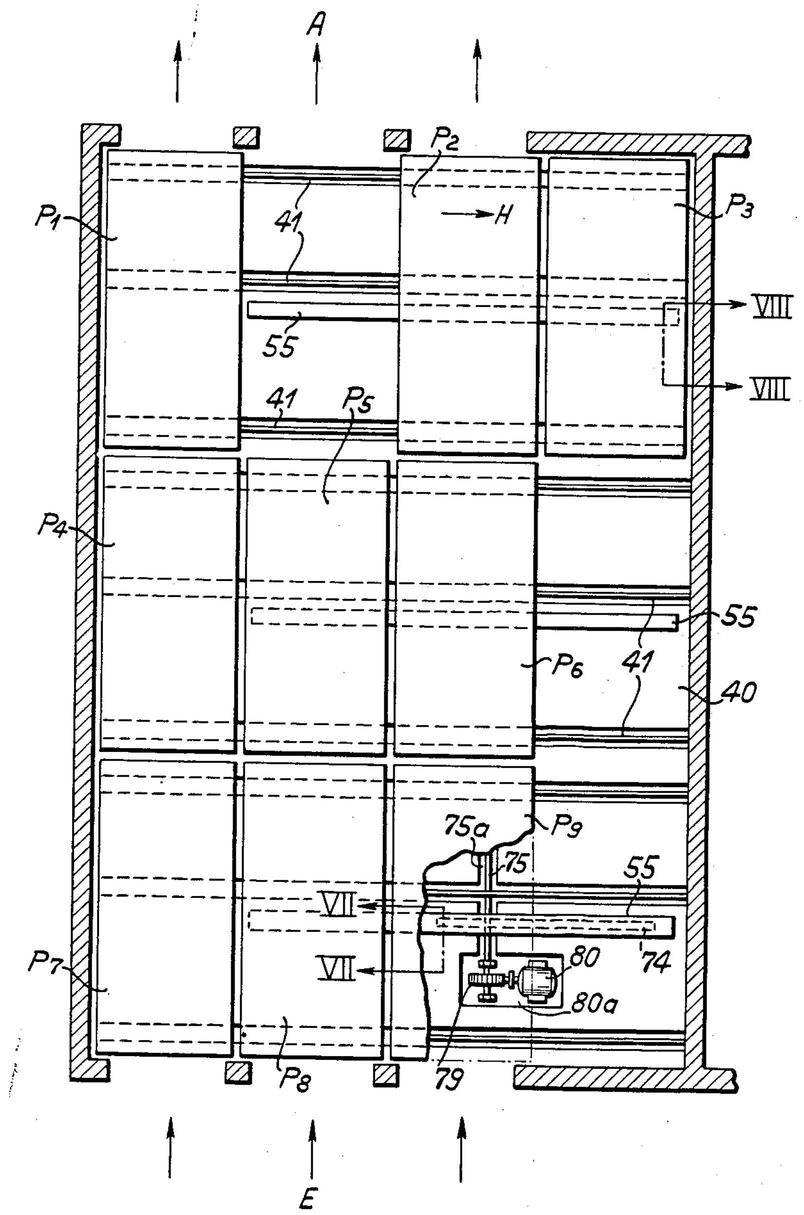
Fig. 1 shows schematically a top plan view of the floor of a garage, equipped with three rows of platforms made in accordance with the invention.
Figure 3:
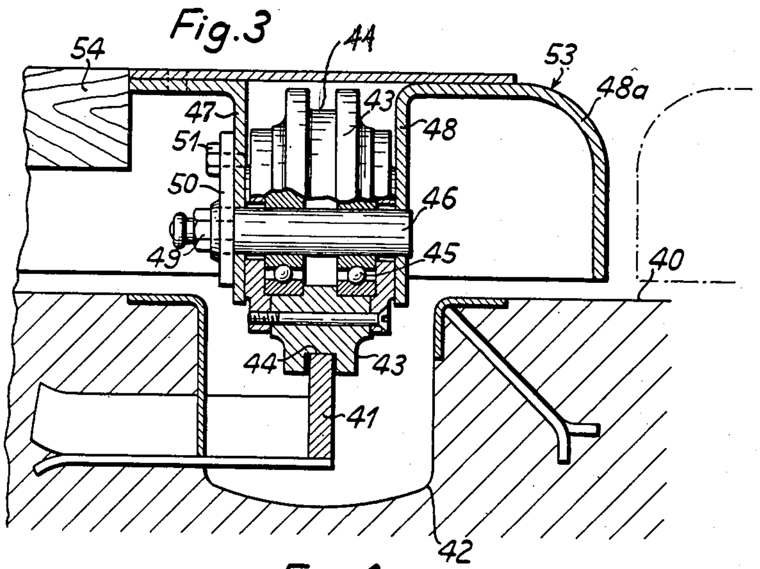
Fig. 3 is an enlarged sectional view taken along lines III—III of Fig. 2.

Referring now more particularly to Fig. 1 of the attached drawings, there is disclosed a floor 40 within a compartmental garage area, over which, as shown, extend nine rectangular-shaped platforms $P_1$ to $P_9$. These platforms are arranged in three horizontal rows, each row including three platforms $P_1$ to $P_3$, $P_4$ to $P_6$ and $P_7$ to $P_9$, respectively. Lengthwise of each of these horizontal rows extend three spaced rails 41 which, as seen in Fig. 3, are recessed within respective grooves 42 of floor 40. The platforms are supported by means of rotatably disposed rollers 43 which bear on these rails in such manner that the platforms may be displaced in lengthwise direction of the horizontal rows. The rollers 43 which run along the median rail 41 of the aforementioned three spaced rails are provided with a suitable peripheral groove 44, shown in dotted lines in Fig. 3. A respective roller 43 engages with this groove 44 rail 41 for guiding the respective platform. The aforesaid rollers are journaled by means of roller bearings 45 on horizontal axles 46 which, in accordance with Fig. 3, are removably supported between two profiled pieces 47 and 48.

Figure 2:
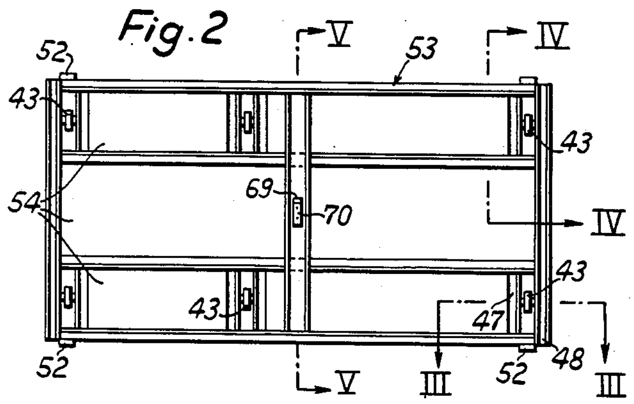
Fig. 2 is a bottom plan view of a single platform drawn to an enlarged scale.
Figure 4:
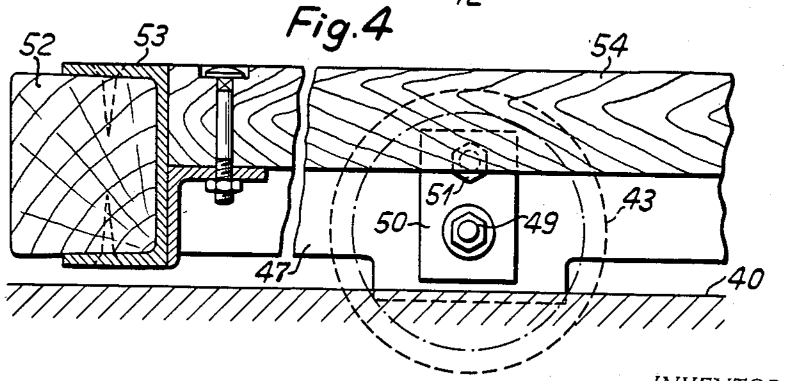
Fig. 4 is an enlarged sectional view taken along lines IV—IV of Fig. 2.

One end of axle 46 is fixed by means of a screw 49 to the holding plate 50 which by means of a screw 51 is detachably affixed to one of the profiled pieces. At the end faces of each platform and at right angles thereto there are arranged two abutments or bumpers 52 made, for instance, of wood, by means of which the platforms of each row come to abut against each other. Each platform is constituted by a frame 53, made from profiled beams according to Figs. 2 to 4, and has a panel 54 forming filling material for said profiled frame 53.

The height of the upper surface of the platforms above floor 40 is so reduced or minimized that the vehicles which are to be stored or accommodated in the garage may be run onto the platforms without any difficulties and without any further auxiliary means. In order to facilitate the movement of the vehicle onto the platforms, the latter are provided with profiled end pieces 48 which terminate each in a rounded end portion **48*a***.

The length of each rail 41 is greater by at least the width of a single platform than the sum of the widths of all the platforms when disposed in a single row as seen in Fig. 1. The floor 40 of the garage, therefore (always seen in the direction of the rails 41), includes at least one uncovered floor area in each row of platforms which corresponds at least to the dimension of a single platform.

By means of selective displacement of platforms $P_1$ to $P_3$ on floor 40, for example, a floor passageway which leads to any one of the platforms $P_4$ to $P_6$ and which corresponds to the width of a single platform may be exposed and made accessible. In accordance with Fig. 1 platforms $P_2$ and $P_3$ are displaced in a direction toward the right so that a passageway (corresponding to the width of a single platform) is formed, leading to platform $P_5$.

For displacing the platforms, conveyer means or elements 55 are provided in the form of push bars each of which runs lengthwise of a respective row of platforms.

Figure 6:
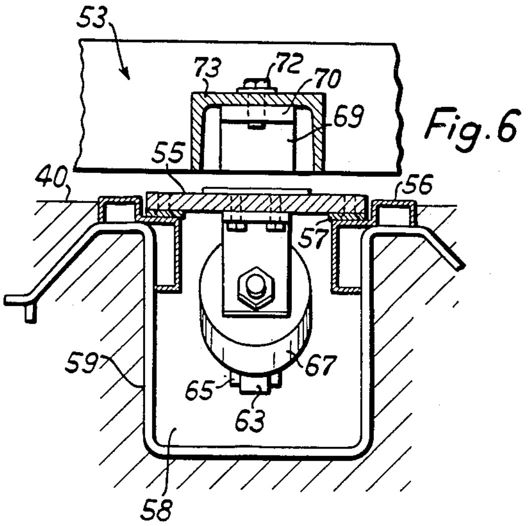
Fig. 6 is an enlarged sectional view taken along lines VI—VI of Fig. 5.
Figure 8:
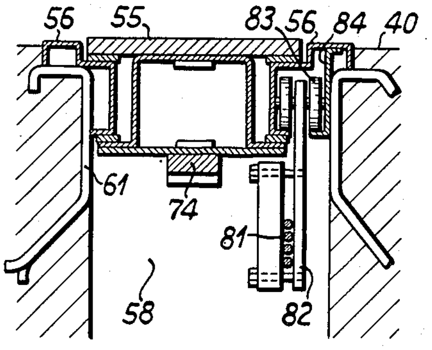
Fig. 8 is an enlarged sectional view taken along lines VIII—VIII of Fig. 1.
Figure 7:
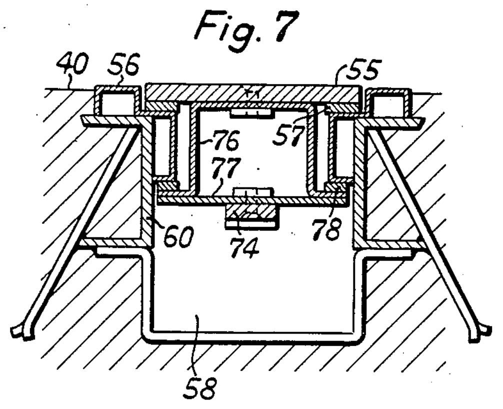
Fig. 7 is an enlarged sectional view taken along lines VII—VII of Fig. 1 and showing a position of the floor of the garage and a conveyor element for the platform.

The push bars or connecting means 55 may be horizontal flat rails which in accordance with Figs. 6 to 8 are recessed within floor 40 and are guided in lengthwise direction during displacement by means of two profiled supporting beams or rails 56. The push bars are further provided with slide elements 57 which bear on a horizontal shoulder of the supporting beams or rails 56. Thus, the push bars 55 slide by means of the sliding elements 57 on said rails 56. Between each two rails 56 and below the push bars 55 there extends a recessed groove 58 spaced from the top surface of the floor 40. The rails 56 rest partly on bent supporting members 59 and partly on beams 60 which are U-shaped in cross-section and further partly on hook-shaped reinforcement elements 61 which are fixed below and within the material of the floor 40 of the garage (Figs. 6 to 8). These elements 61 at least partly define the grooves 58.

Each of the push bars 55 is provided, in the present instance, with at least three coupling members 62 (Fig. 5), each of which being held on a segment 63 which in turn is swingable about a bearing 64 and extends below the push bar 55. To segment 63 there are linked two elements 65 which are operatively connected to the armature of electromagnet 67 by means of a bolt 66 which is displaceable in lengthwise direction thereof. The electromagnet 67 as well as the just mentioned mechanism for operating the coupling or engageable members 62 are disposed at the underside of the push bar 55.

Figure 5:
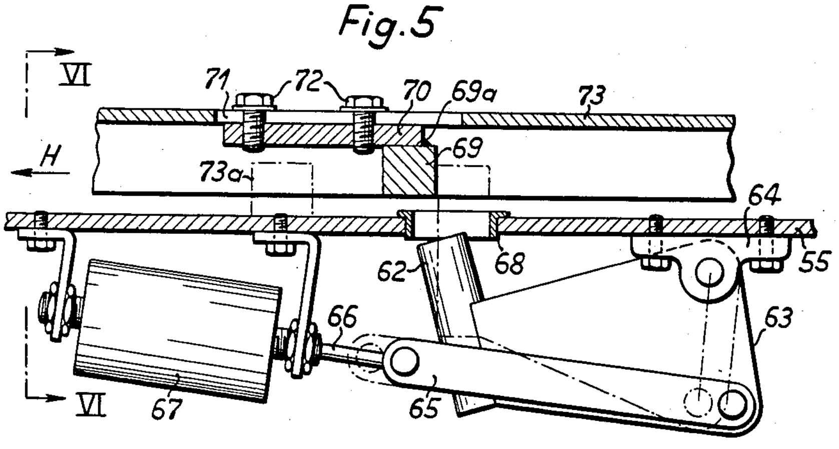
Fig. 5 is another enlarged sectional view taken along lines V—V of Fig. 2.

Within the push bar 55 there is disposed a ring member 68 through which coupling element 62 passes upon excitation of electromagnet 67 so that element 62 extends then to the upper surface of the push bar 55, as indicated in dash and dot lines (Fig. 5).

The underface of each platform is provided with an abutment 69 which is shaped to coact with a respective coupling element 62. Abutment 69 is rigidly connected to plate member 70 as indicated by weld seam **69*a*; plate 70 being displaceable and adjustable by means of two screw bolts 72 which pass through a slot 71 provided in beam 73 of platform frame 53. The coupling element 62 and abutment 69 just referred to serve the purpose of displacing the platform in a direction according to arrow H as seen in Figs. 1 and 5. For displacing the platform in opposite direction each push bar 55 is provided with a rigid shoe 73*a* (indicated in dotted lines), adapted to engage abutment 69 for cooperation with platforms $P_3$, $P_6$ and $P_9$. It should be noted that as coupling member or dog 62 is moved into operative engagement with fixed abutment 69, it also engages the side of the ring 68. Thus any thrust due to movement of the platform by the push bar 55** is borne by the ring and takes the strain from the electromagnetic operating mechanism below.

In order to impart movement to the push bars 55, the same are each provided with a rack 74 fixed to the underface of the respective push bar 55. This rack 74 projects into the groove 58 and engages a respective gear or pinion (not shown) coordinated thereto. These gears are all arranged on the same shaft 75 (Fig. 1) which is journaled within a suitable groove **75*a* recessed in the floor 40. The teeth of the racks 74** extend in downward direction and engage therefore the gears only from above.

For connecting the racks with the respective push bars 55, U-shaped beams or rails 76 and flat rails 77 are provided (Fig. 7). The outwardly projecting rims of these latter parts 76, 77 bear each on a slide rail 78 which abut from below against respective horizontal shoulders of rails 56. The heretofore mentioned gears form parts of a drive mechanism which includes a worm gear 79 on shaft 75, worm wheel 79 which engages a worm (not shown) and further an electric motor 80 which is accommodated within recess **80*a* of the garage floor 40. During operation this recess provided in the garage floor 40 is usually covered by a lid and the electromotor 80** is designed to be reversibly controlled in two different directions of rotation.

All grooves 42 and 58, as well as the grooves **75*a*, 80*a*** receiving the drive aggregate are shaped and profiled as to facilitate removal of dirt or water and are provided with an incline toward a drain or discharge canal (not shown).

The electric conductors 81 which lead to the electromagnets 67 connected with the push bars 55, are fixed in accordance with Fig. 8 to runners 82 which are displaceable by means or rollers 83 along profiled rail 56 which, in this particular instance, is reinforced by means of a further profiled rail 84.

The electric control system for operation of the motor 80 and of the electromagnet 67 is schematically shown in Figs. 9 and 9*a*. The motor 80 has two field windings V and W for both directions of rotation. The windings of electromagnets 67 are designated with $M_1$ to $M_9$ whereby it is assumed that the magnet $M_1$ is coordinated to the platform $P_1$ and the magnet $M_2$ to the platform $P_2$. The space arrangement for the magnet winding (Fig. 9) does not coincide with the space arrangement for the platforms in accordance with Fig. 1. The supply of electric current to the magnet windings occurs through a rectifier G. For controlling the motor 80 relay switches S and Q are employed each of which being designated for the respective direction of rotation. The motor 80 is operatively connected with a screw-threaded spindle B which carries a rotatable nut with finger F, which is employed to actuate the end switches $E_s$ and $E_o$ after the platforms have performed the necessary path for which they are designed.

For the selective control of the entire plant selector switches are employed, such as, for instance, push button switches $DE_1$ to $DE_6$ and $DA_4$ to $DA_9$ which are connected by means of relays $E_1$ to $E_6$ and $A_4$ to $A_9$ with magnet windings and motor relay Q. Further, there is disposed a push button DS to check the motor relay switch S and a further push button DH to bring about immediate stoppage of the plant, if necessary. The terminals R and O are employed to facilitate connection with an alternating current source. In accordance with Fig. 1 it will become apparent that the garage has an entrance in accordance with the arrows E and an exit in accordance with arrows A whereby oppositely positioned gates may be employed.

To operate the garage the following is to be observed: In the position of rest the platforms of each row abut against each other and are placed toward the left, as seen in Fig. 1. The movable parts assume the position as illustrated in Fig. 9. When vehicles are being stored on platforms $P_7$ to $P_9$ no displacement of the platforms is necessary since each vehicle or car can run in the direction of arrows E directly onto the platforms. It is also not necessary to displace any platforms when vehicles or cars are to be removed from the platforms $P_1$ to $P_3$ in accordance with arrows A of Fig. 1. If it is now desired to remove a car from platform $P_5$ in the direction of arrows A and platform $P_2$ immediately in front thereof is loaded with a car, then the push button switch $DA_5$ is actuated which prepares the discharge of the car placed on platform $P_5$ therefrom. The following circuit is then closed: Terminal R, push button switch DH, conductor 29, rest contact of relay S, conductor 27, limit switch $E_o$, conductor 13, switch $DA_5$, conductor 8, winding of relay $A_5$ back through conductor to terminal O. This circuit effectuates excitation of relay $A_5$. Thus, the relay $A_5$ is attracted and holds the working contact 8—13. The relay further connects through working contact 13—31 rectifier G to the alternating current voltage and, by means of the contact 21—32 the magnet winding $M_2$ with the direct current circuit of the rectifier G.

The electromagnet 67 below platform $P_2$ upon being excited causes the respective coupling member 62 to be swung in upward direction by means of push bar 55. At the direct current side of the rectifier G there is arranged the winding of the control relay Q so that the latter will also be attracted. Now the following motor circuit is closed through the working contact 25—29: Terminal R, switch DH, conductor 29, conductor 25—29 of relay Q, conductor 25, winding V and the armature of motor 80 back through conductor to terminal O.

Consequently the motor will be rotated in predetermined direction. Due to this rotational movement of the motor all push bars 55 are moved in the direction of the arrows H in Figs. 1 and 5. The coupling piece or member 62 below platform $P_2$ now only engages abutment 69 of that platform so that the same is being pushed towards the right (Fig. 1) while platform $P_3$ is displaced together with it. Thus, the desired free access or passageway to platform $P_5$ is effectuated for discharge of a car. After the platform $P_2$ and $P_3$ have followed the necessary path, the finger F actuates the end switch $E_o$. Under these circumstances the first named circuit is then interrupted, the relay $A_5$ drops and also relay switch Q. Motor 80 now comes to a standstill and all elements of the control system assume again their original or starting position.

When the vehicle or car has been discharged from the garage platform $P_5$, the push button DS is actuated, which closes the following circuit: Terminal R, switch DH, conductor 29, rest contact 28—29 of the relay switch Q, conductor 28, end switch Es, conductor 26, switch DS, conductor 23, winding of the relay switch S and conductor 11 back to terminal O.

Relay switch S is attracted and is maintained through its own working contact 23—26.

By means of the working contact 24—29 the following motor circuit is closed: Terminal R, switch DH, conductor 29, contact 24—29, conductor 24, winding W and armature of the motor 80 and back through conductor leading to terminal O.

The motor now rotates in a direction opposite to the previous direction so that all push bars 55 of Fig. 1 will be moved to the left (Fig. 1). Consequently the fixed abutment or engaging member 73*a* (Fig. 5) of the upper push bar comes to lie against abutment 69 of platform $P_3$ (Figs. 1 and 5). This platform will then be moved in a direction opposite to arrow H, thereby pushing platform $P_2$ ahead of it. As soon as the platforms $P_2$ and $P_1$ are disposed in abutting relation to each other, finger F actuates the limit or end switch $E_s$ so that the aforesaid circuit will again be interrupted and the motor comes to a standstill.

If during the aforementioned performances the movement is to be interrupted for one reason or another, then only the push button switch DH is to be actuated, whereby the aforementioned circuits are immediately interrupted.

As it is apparent from Fig. 9, upon excitation of relay switch Q the rest contact 28—29 thereof is opened, whereby it will be prevented that upon actuation of the switch DS also the other relay switch S would be excited. Furthermore, upon excitation of relay S the resting contact 27—29 thereof is opened, whereby it becomes impossible that simultaneously upon operation of one of the remaining push button switches DE or DA excitation of the relay switch Q could occur. Both these relay switches Q and S may be locked against each other.

In a similar way as indicated above, the garage arrangement may also be operated, for instance, if one car is driving in the direction of arrow E onto platform $P_3$ and if the platforms $P_6$ and $P_9$ are already loaded with cars. In such a situation one actuates switch $DE_3$ preparatory to the loading of the platform $P_3$. Under these circumstances the relay $E_3$ becomes excited whereby the windings $M_6$ and $M_9$ of the corresponding electromagnets 67 which are mounted below the platforms $P_6$ and $P_9$ are put under continuous current and thus couple these platforms with their respective push bars 55. Simultaneously the relay switch Q becomes excited and as hereinabove described the motor will be rotated under action of winding V thereof. Consequently the two platforms $P_6$ and $P_9$ are then displaced to the right in accordance with Fig. 1, until the desired passageway before platform $P_3$ will be accessible. Then this operation will be cut off by means of end switch $E_o$.

If one desires to place the platforms together again, then one pushes button DS, whereby the mode of operation is similar to that of the foregoing example wherein the fixed engaging members 73*a* of the push bars will displace the remaining platforms to assume again their original position.

The rails 41 are preferably slightly inclined toward the left wall of the garage as seen in Fig. 1, so that the platforms in their position of rest are not readily separated from each other or displaced and remain in such position through the action of gravity.

The electrical control arrangement can also be altered that always all platforms to be displaced are coupled with their coordinated push bars so that, as follows from the above, that platform which is the last one, as seen in the direction of displacement, will take along and displace all the other platforms disposed ahead of and adjacent the last platform.

The electrical control arrangement functions in a manner that every time the operation of a single selector switch DE or DA will be had, all those platforms are controlled independently from each other which have to provide or open up a passageway to one of the predetermined and desired platforms.

From the foregoing description one may easily recognize that none of the platforms is firmly and fixedly coupled with its coordinated push bar. This provides the possibility that a single drive aggregate may be employed for all push bars without always moving at least one platform of each row, if one platform is to be displaced in a different or other row.

Naturally it is also possible that from each push bar a separate drive means is provided or only a portion of the conveyer system of the aforesaid rows may be operatively connected with a common drive means.

The garage can also be built so that the entrance and the exit for the cars occurs on one and the same side. In such a case no separate sets of selector switches DE and DA with their coordinated relays E and A are needed to prepare for the approach and the exit for the cars.

In the embodiment of the invention as shown, it has been assumed that only nine platforms are installed. It is clear that the advantages of the garage will only then be fully appreciated, if a relatively large number of platforms are employed, for example 49 or 100 platforms, so that each row contains 10 platforms, respectively. The number of rows must not necessarily coincide with the total number of platforms in each row.

The garage hereinabove described in greater detail is adapted to accommodate different vehicles, in particular automobiles, cars, etc. The garage in accordance with the invention has the particular advantage that it contributes to considerable saving of space and that speedy and convenient driving of the cars to and from a predetermined location may be had.

Although the specific embodiment of the invention has been described and shown in the drawings, it should be noted that the invention may be realized in modified form and adaptations of the arrangement herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

1. In a garage system; a row of movable platforms, a movable drive bar for moving said platforms and positioned below said row of platforms, a plurality of movable abutment means located on the underface of said drive bar and selectively movable respectively into engagement with a first fixed abutment provided on each of said platforms therebelow to move same in one direction by said drive bar, and a second fixed abutment on said drive bar for respectively engaging said first fixed abutment for moving said platforms in the opposite direction said movable abutment means being normally situated on a face of said drive bar opposite to the face on which said second fixed abutment is located.

2. In a garage storage system; a platform, a movable drive bar situated below said platform for moving said platform, means for coupling said drive bar to said platform, said means comprising a fixed abutment on the underface of said platform, said drive bar being provided with an aperture, a movable abutment mounted for swinging movement through said aperture into engagement with said fixed abutment and with a wall portion defining said aperture, and means mounted on and below said drive bar for actuating said movable abutment, said actuating means including electromagnetic means, and lever means operatively connected with said electromagnetic means.

3. In a garage system having at least one row of movable platforms; the combination of an electrical control system having a plurality of selectively operable switch means, a drive bar common to said row of platforms, a motor operatively connected to said drive bar, a plurality of electromagnetic means mounted on and below said drive bar and including operable means for selectively coupling and uncoupling said platforms to said drive bar, said switch means being cordinated with said electromagnetic means and being adapted to selectively operate one of said electromagnetic means thereby to operatively connect one of said operable means to one of said platforms to thereby move said one platform through the intermediary of said drive bar and means for controlling the operation of said motor, each of said selectively operable switch means being operatively connectable with said motor control means.

4. In a garage system according to claim 3, including an inclined pathway below said platforms, to thereby normally maintain platforms biased toward one side of the floor area of the garage.

References Cited in the file of this patent

UNITED STATES PATENTS

| | | |
|---|---|---|
| 1,341,097 | Young | May 25, 1920 |
| 1,667,737 | Nichols | May 1, 1928 |
| 1,869,046 | Buck | July 26, 1932 |
| 2,009,579 | Ewend | July 30, 1935 |
| 2,166,704 | Foulkes | July 18, 1939 |
| 2,201,939 | Auger et al. | May 21, 1940 |
| 2,605,911 | Medway | Aug. 5, 1952 |

FOREIGN PATENTS

| | | |
|---|---|---|
| 576,627 | Great Britain | Apr. 12, 1946 |